United States Patent [19]

Emert et al.

[11] Patent Number: 5,780,554
[45] Date of Patent: Jul. 14, 1998

[54] SATURATED POLYOLEFINS HAVING TERMINAL ALDEHYDE OR HYDROXY SUBSTITUENTS AND DERIVATIVES THEREOF

[75] Inventors: Jacob Emert, Brooklyn, N.Y.; Istvan T. Horvath, High Bridge, N.J.; Richard H. Schlosberg, Bridgewater, N.J.; Warren A. Thaler, Flemington, N.J.; David A. Young, Seattle, Wash.; Stephen Zushma, Clinton, N.J.

[73] Assignee: Exxon Chemical Patents Inc., Linden, N.J.

[21] Appl. No.: 742,957

[22] Filed: Nov. 1, 1996

Related U.S. Application Data

[63] Continuation of Ser. No. 206,993, Mar. 7, 1994, abandoned.

[51] Int. Cl.$^6$ ............................................ C08F 8/32
[52] U.S. Cl. ................. 525/370; 525/333.7; 525/371; 525/378; 525/379; 525/383
[58] Field of Search ........................ 525/370, 371, 525/378, 379, 383

[56] References Cited

U.S. PATENT DOCUMENTS

| | | | |
|---|---|---|---|
| 3,311,598 | 3/1967 | Mertzweiller et al. | 260/85.1 |
| 3,438,757 | 4/1969 | Honnen et al. | 44/58 |
| 4,234,435 | 11/1980 | Meinhardt et al. | 252/51.5 A |
| 4,271,088 | 6/1981 | Butte et al. | 260/465.6 |
| 4,526,936 | 7/1985 | Jachimowicz et al. | 525/379 |
| 4,558,101 | 12/1985 | Jachimowicz et al. | 525/333.2 |
| 4,657,984 | 4/1987 | McEntire et al. | 525/340 |
| 4,665,208 | 5/1987 | Welborn et al. | 556/179 |
| 4,717,755 | 1/1988 | Doi et al. | 525/333.7 |
| 4,739,120 | 4/1988 | Zuckerman | 564/385 |
| 4,790,957 | 12/1988 | Mach et al. | 252/56 S |
| 4,798,873 | 1/1989 | Meurer et al. | 525/383 |
| 4,832,702 | 5/1989 | Kummer et al. | 44/62 |
| 4,859,210 | 8/1989 | Franz et al. | 44/53 |
| 4,871,705 | 10/1989 | Hoel | 502/117 |
| 4,935,550 | 6/1990 | Miller et al. | 568/454 |
| 4,937,299 | 6/1990 | Ewen et al. | 526/119 |
| 4,970,266 | 11/1990 | Drent et al. | 525/340 |
| 5,017,299 | 5/1991 | Gutierrez et al. | 252/51.5 R |
| 5,017,714 | 5/1991 | Welborn, Jr. | 556/12 |
| 5,055,438 | 10/1991 | Canich | 502/117 |
| 5,057,475 | 10/1991 | Canich et al. | 502/104 |
| 5,064,802 | 11/1991 | Stevens et al. | 502/155 |
| 5,075,507 | 12/1991 | Carr et al. | 564/491 |
| 5,096,867 | 3/1992 | Canich | 502/103 |
| 5,120,867 | 6/1992 | Welborn, Jr. | 556/12 |
| 5,153,157 | 10/1992 | Hlatky et al. | 502/117 |
| 5,198,401 | 3/1993 | Turner et al. | 502/155 |
| 5,227,440 | 7/1993 | Canich et al. | 526/129 |
| 5,241,025 | 8/1993 | Hlatky et al. | 526/129 |
| 5,340,881 | 8/1994 | Kennedy et al. | 525/333.7 |
| 5,567,845 | 10/1996 | Franz et al. | 525/383 |

FOREIGN PATENT DOCUMENTS

| | | |
|---|---|---|
| 0129368 | 12/1984 | European Pat. Off. |
| 0268214 | 5/1988 | European Pat. Off. |
| 0277003 | 8/1988 | European Pat. Off. |
| 0277004 | 8/1988 | European Pat. Off. |
| 0 511 846 A1 | 11/1992 | European Pat. Off. |
| 0520732 | 12/1992 | European Pat. Off. |
| 0541176 | 5/1993 | European Pat. Off. |
| 0541176 | 12/1993 | European Pat. Off. |
| 1-132604 | 5/1989 | Japan . |
| 1 378 185 | 12/1974 | United Kingdom . |
| WO90/05711 | 5/1990 | WIPO . |
| WO91/04257 | 4/1991 | WIPO . |
| WO 91/11469 | 8/1991 | WIPO . |
| WO92/00333 | 1/1992 | WIPO . |
| WO92/01730 | 2/1992 | WIPO . |
| WO93/08199 | 4/1993 | WIPO . |
| WO93/08221 | 4/1993 | WIPO . |

OTHER PUBLICATIONS

Journal of Molecular Catalysis, vol. 69, issued 1991 Di Serio et al., "Hydroformylation of Polyisobutene", pp. 1–14, abstract: Chem. Abstracts No. 115:208815v.

Advanced Inorganic Chemistry, F. A. Cotton, G. Wilkinson 5th Ed. 1988, John Wiley & Sons (Book will be provided upon request).

*Primary Examiner*—Bernard Lipman
*Attorney, Agent, or Firm*—E. C. Bakun

[57] ABSTRACT

A saturated polymer having a terminal aldehyde or hydroxy substituent which may be used directly or in a derivative form as a dispersant for both fuel and lubricating oil compositions, wherein the saturated polymer has a $M_n$ of about 300 to 10,000, and is derived from a polyolefin which is derived from a monomer of the formula $H_2C=CHR^4$, wherein $R^4$ is hydrogen or a straight or branched chain alkyl radical, and wherein the polyolefin has at least about 30% terminal vinylidene unsaturation. Particularly desirable amine derivatives can be formed by either a single step aminomethylation process or a two step hydroformylation and reductive amination process.

8 Claims, No Drawings

SATURATED POLYOLEFINS HAVING TERMINAL ALDEHYDE OR HYDROXY SUBSTITUENTS AND DERIVATIVES THEREOF

This is a continuation of application Ser. No. 08/206,993, filed Mar. 7, 1994 now abandoned.

FIELD OF THE INVENTION

This invention relates to improved oil soluble dispersant additives useful in both fuel and lubricating oil compositions produced by the hydroformylation of certain olefin-terminated polymers to yield polymeric alcohols and aldehydes, and to further derivatizing these functional polymers to obtain aminated polymers. This invention also relates to the direct production of aminated polyolefins by means of a one step aminomethylation process.

BACKGROUND OF THE INVENTION

Dispersants keep insolubles within the oil suspension, thus preventing sludge flocculation and precipitation. Suitable dispersants include, for example, dispersants of the ash-producing and ashless type. Derivatized olefinic polymers have been used as ashless dispersants and multifunctional viscosity index improvers in lubricant and fuel compositions.

In the lubricating oil sector, these are generally referred to as ashless dispersants, and, in the case of the polybutylphenols, as Mannich dispersants. The purpose of these dispersants is to keep in suspension oil-insoluble combustion residues, and thereby prevent deposits on metal surfaces, thickening of the oil and sludge deposits in the engine and to avoid corrosive wear by neutralizing acidic combustion products.

In the motor fuel sector, the secondary products are generally referred to as carburetor or valve detergents. Their task is to free the entire intake system from deposits, to prevent further deposits and to protect the system from corrosion.

Functionalized olefinic polymers are particularly useful as additives in fuels and lubricating oils. Fuels include normally liquid petroleum fuels such as middle distillates boiling from 65° C. to 430° C., including kerosene, diesel fuels, home heating oil, jet fuels, etc. A concentration of the additives in the fuel is in the range of typically from 0.0001 to 0.5, and preferably from 0.005 to 0.15 wt. %, based on the total weight of the composition.

Additives may also be used in lubricating oil compositions which employ a base oil in which the additives are dissolved or dispersed therein. Such base oils may be natural or synthetic. Base oils suitable for use in preparing the lubricating oil compositions include those conventionally employed as crankcase lubricating oils for spark-ignited and compression-ignited internal combustion engines, such as automobile and truck engines, marine and railroad diesel engines, and the like. Advantageous results are also achieved by employing such additives in base oils conventionally employed in and/or adapted for use as power transmitting fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

Functional polymers having a number average molecular weight ($M_n$) in the range of 700–5,000 have been used as intermediates in the synthesis of dispersants (i.e., additives) for fuel and lubrication applications. The most common functional groups are cyclic anhydrides, carboxylic acids, and phenols. These groups could be further elaborated to imides, and amides and Mannich based products with a variety of polyamines.

A conventional method of preparing polymeric acids and anhydrides generally involves pericyclic reactions of $\alpha,\beta$-unsaturated carbonyl compounds with polymeric olefins either directly or in the presence of chlorine. These reactions often lead to the incorporation of more than one functional group per polymer.

The cobalt or rhodium-mediated hydroformylation of olefin polymers has been utilized to a more limited extent to prepare alcohols and aldehydes. Use of the hydroformylation process results in the consumption of the carbon-carbon double bond during the reaction, thereby introducing only one functional group per polymer in the absence of diene comonomers.

U.S. Pat. No. 3,311,598 (Mertzweiller et al.), which issued on Mar. 28, 1967, discloses the hydroformylation of a multi-olefinic hydrocarbon polymer with carbon monoxide, and hydrogen, in the presence of catalyst containing a transition metal selected from Group VIII of the Periodic Chart, to form hydroxylated (—CH$_2$OH) and/or carbonyl (—CHO) derivatives of the polymer. The polymer is preferably either a polymer of polybutadiene, polycyclopentadiene, polyisoprene, and mixtures thereof, a butadiene-styrene copolymer, a pentadiene-styrene copolymer, or an isoprene-styrene copolymer.

Polyisobutene derivatives (e.g., polyisobutylamines) have frequently been described in the literature and are used worldwide on a large scale as lubricant and motor fuel additives. The intermediates for the preparation of such additives are polybutenyl chloride, polybutenylsuccinic anhydride and polybutylphenols. See U.S. Pat. No. 4859210 (Franz et al.), which issued on Aug. 22, 1989, and U.S. Pat. No. 4,832,702 (Kummer et al.), which issued on May 23, 1989, and WO-A 90/05711, published on May 31, 1990.

The efficiency of the hydroformylation reaction as applied to polyisobutylene (PIB) varies with the type of polymer, and conversions range from 59–81% with the most reactive PIB's available (see U.S. Pat. No. 4,832,702). It would be highly desirable to increase the rate of conversion in the hydroformylation of polyolefins to as close to 100% as is technically feasible.

The present inventors have discovered that olefinic polymers prepared with a metallocene catalyst are especially suited for use in the hydroformylation process and synthesis of unique polymeric alcohols and aldehydes in substantially higher yields than even the reactive PIB's on an equal weight percent basis.

Unfortunately, hydroformylation has been observed to produce undesirable side products. Attempts to produce polymer aldehyde in high yield from metallocene catalyzed olefinic polymers and vinylidene containing models has shown that 15–20% of the olefin is typically hydrogenated using cobalt catalyst; furthermore, there is a conversion-dependent loss of aldehyde to alcohol which also limits the yield of aldehyde available for reductive amination. The present inventors have also discovered that amine derivatives may be prepared in substantially higher yields by subjecting the metallocene-catalyzed olefinic polymers to aminomethylation in a single step rather than the conventional two step process of hydroformylation followed by reductive amination.

SUMMARY OF THE INVENTION

The invention is a saturated polymer having a terminal aldehyde or hydroxyl substituent, a $M_n$ of about 300 to 10.000, and derived from a polyolefin derived from a monomer of the formula $H_2C=CHR^4$ wherein $R^4$ is hydrogen or a straight or branched chain alkyl radical. The polyolefin preferably has at least about 30% terminal vinylidene unsaturation.

This polyolefin is formed from the reaction product of alkene and α-olefin monomers in the presence of a metallocene catalyst. Preferred polyolefins are ethylene/α-olefin, a propylene/butene-1 copolymer, or a butene-1 polyolefin.

Alternatively, the substituent of the saturated polymer is alkylamine. In this instance, the preferred polyolefin is a butene homopolymer, an ethylene/propylene copolymer, or an ethylene/butene copolymer.

The present invention also includes a saturated polymer having a terminal alkylamino substituent, a $M_n$ of about 300 to 10.000, and derived from a polyolefin derived from a monomer of the formula $H_2C=CHR^4$ wherein $R^4$ is hydrogen or a straight or branched chain alkyl radical. Preferably, this polyolefin has at least about 30% terminal vinylidene unsaturation.

Furthermore, the present invention includes a polymeric hydroformylation alcohol or aldehyde reaction product which is formed by the reaction of: a polyolefin having $M_n$ of about 300 to 10.000 and derived from a monomer of the formula $H_2C=CHR^4$, wherein $R^4$ is hydrogen or a straight or branched chain alkyl radical; hydrogen; and carbon monoxide in the presence of a hydroformylation catalyst. Preferably, the polyolefin has at least 30% terminal vinylidene unsaturation.

The hydroformylation reaction preferably occurs at a temperature in the range between about 25° to 200° C. and a pressure in the range between about 1 to 350 bars. This hydroformylation reaction is, optionally, followed by reductive amination of the hydroformylation polymeric reaction product, whereby a saturated polymer having an alkylamino substituent is formed.

Alternatively, an alkylamino substituted polymer dispersant can be formed in a single step aminomethylation process wherein an amine is mixed together with the polymer and syn gases in the presence of a noble metal catalyst. The noble metal catalyst is preferably selected from the group consisting of: rhodium, ruthenium, rhenium and mixtures thereof. This aminomethylation reaction typically occurs at a temperature in the range between about 25° to 200° C. and a pressure in the range between about 1 to 100 bars.

The polymeric hydroformylation reaction product can be further cyanoalkylated and hydrogenated.

DESCRIPTION OF THE PREFERRED EMBODIMENTS

Unique polymeric aldehydes and alcohols can be synthesized by the hydroformylation of polyolefins formed from the reaction product of alkene and α-olefin (up to $C_{16}$) monomers in the presence of a metallocene catalyst. Preferred polyolefins are ethylene/α-olefin homopolymers and copolymers, a propylene/butene-1 copolymer, or a butene-1 polyolefin. These polymeric aldehydes and alcohols are particularly useful as products or intermediates for lubrication and fuel dispersants.

The hydroformylation reaction of an ethylene-α-olefin polymer (EP), carbon monoxide, and hydrogen in the presence of dicobalt octacarbonyl catalyst (Co) is set forth below, wherein the hydroformylation step is followed by a reductive amination step to produce amine derivatives of the resultant polymeric aldehyde product. The hydroformylation and reductive amination process is hereafter referred to as "the two step process".

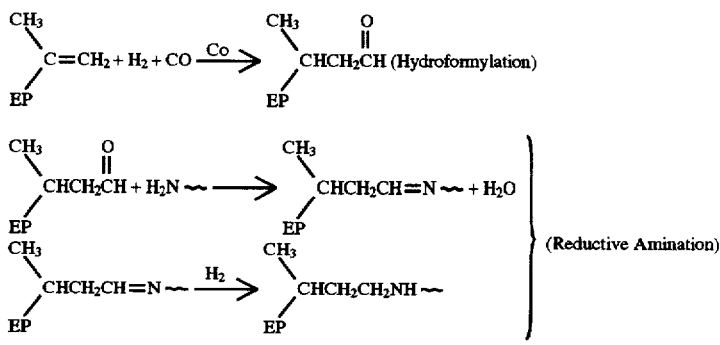

It is also possible, and in many instances preferable, to conduct a single (or "one step process") aminomethylation step wherein a higher conversion of the aldehyde to its derivatized amine product is observed. An aminomethylation reaction in the presence of a rhodium dicarbonyl acetylacetonate catalyst is set forth below.

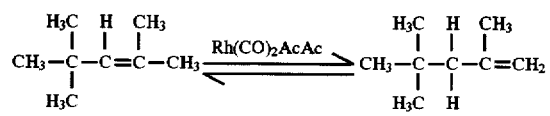

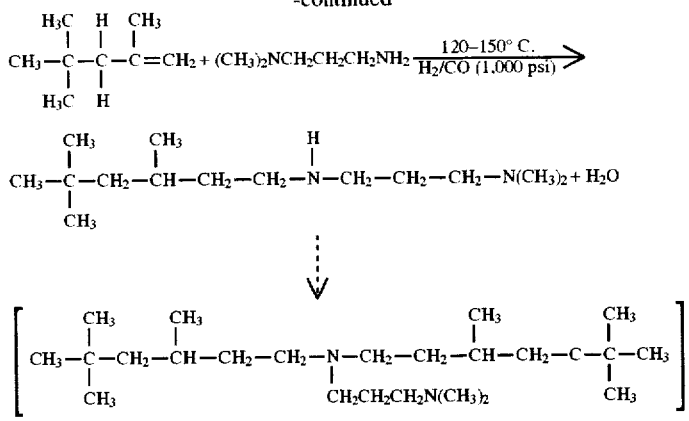

-continued $$CH_3-\underset{\underset{H_3C}{|}}{\overset{\overset{H_3C}{|}}{C}}-\underset{|}{\overset{H}{C}}-\underset{\underset{H_3C}{|}}{\overset{\overset{CH_3}{|}}{C}}=CH_2 + (CH_3)_2NCH_2CH_2CH_2NH_2 \xrightarrow[H_2/CO\ (1,000\ psi)]{120-150^\circ\ C.}$$

$$CH_3-\underset{\underset{CH_3}{|}}{\overset{\overset{CH_3}{|}}{C}}-CH_2-\overset{\overset{CH_3}{|}}{CH}-CH_2-CH_2-\overset{\overset{H}{|}}{N}-CH_2-CH_2-CH_2-N(CH_3)_2 + H_2O$$

$$\Big[CH_3-\underset{\underset{CH_3}{|}}{\overset{\overset{CH_3}{|}}{C}}-CH_2-\overset{\overset{CH_3}{|}}{CH}-CH_2-CH_2-\underset{\underset{CH_2CH_2CH_2N(CH_3)_2}{|}}{N}-CH_2-CH_2-\overset{\overset{CH_3}{|}}{CH}-CH_2-\underset{\underset{CH_3}{|}}{\overset{\overset{CH_3}{|}}{C}}-\overset{\overset{CH_3}{|}}{\underset{\underset{CH_3}{|}}{C}}-CH_3\Big]$$

The overall aminomethylation process can be formally divided into three reactions. The first is hydroformylation leading to the formation of a polymeric aldehyde followed by condensation, resulting in the intermediate formation of Schiff's base or enamine, and subsequently hydrogenation of the C=N or C=C—N bond, respectively, producing the desired end product amine. The typical aminomethylation mechanism is believed to be as follows:

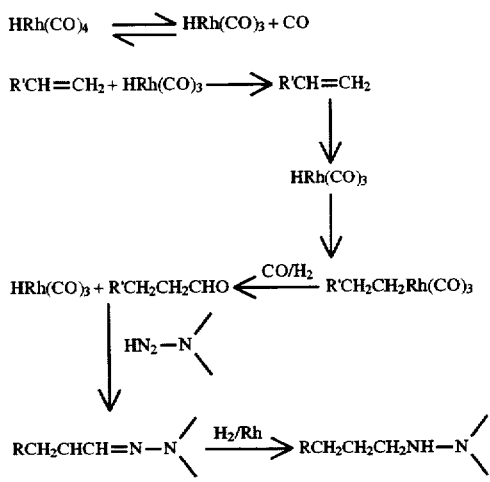

The present inventors have discovered that when the one step aminomethylation process is used to produce polyamines from metallocene catalyzed α-olefin polymers, it is less desirable to use a cobalt catalyst as the hydroformylation catalyst. That is, the cobalt catalyst is altered when an amine is added thereto. This is because the amine deactivates the cobalt catalyst, thereby making it ineffective as a hydrogenation catalyst and thus inhibiting hydroformylation. It is necessary when running the one step aminomethylation process to use a catalyst of rhodium, ruthenium, rhenium or mixtures thereof, which does not deactivate in the presence of amines. A preferred catalyst is rhodium with or without ligands, such as phosphines. Phosphines containing a carboxylic acid group can be used to change the solubility characteristics of the rhodium by alternatively neutralizing and acidifying as a means of recovering the rhodium. The rhodium can be anchored to solid substances as well. One suitable method is through the use of phosphines containing sulfonate groups which can be anchored on macroporous glass substrates.

Cobalt catalysts can still be used in the two step process, so long as there is a cobalt catalyst recovery step prior to the reductive amination of the resulting polymeric aldehyde and alcohol. However, the two step process has the additional drawbacks of (1) paraffin formation may be unacceptably high, and (2) conversion to the selected polymeric amine will be reduced by the need to avoid alcohol formation.

METALLOCENE CATALYST

The catalyst for the production of polyolefins is preferably a bulky ligand transition metal compound. The bulky ligand may contain a multiplicity of bonded atoms, preferably carbon atoms, forming a group which may be cyclic with one or more optional heteroatoms. The bulky ligand may be a cyclopentadienyl derivative which can be mono- or polynuclear. One or more bulky ligands may be bonded to the transition metal atom. The transition metal atom may be a Group IV, V or VI transition metal comprehensively presented in "Advanced Inorganic Chemistry," F. A. Cotton, G. Wilkinson, Fifth Edition, 1988, John Wiley & Sons). Other ligands may be bonded to the transition metal, preferably detachable by a cocatalyst such as a hydrocarbyl or halogen leaving group. The catalyst is derivable from a compound of the formula:

$$[L_mM]S_n$$

wherein L is the bulky ligand, X is the leaving group, M is the transition metal and m and n are such that the total ligand valency corresponds to the transition metal valency. Preferably the catalyst is four coordinate such that the compound is ionizable to a $1^+$ valency state.

The ligands L and X may be bridged to each other and if two ligands L and/or X are present, they may be bridged. The metallocenes may be full-sandwich compounds having two ligands L which are cyclopentadienyl groups or half-sandwich compounds having one ligand L only which is a cylcopentadienyl group.

For the purposes of this patent specification the term "metallocene" is defined to contain one or more cyclopentadienyl moiety in combination with a transition metal of the Periodic Table of Elements. In one embodiment the metallocene catalyst component is represented by the general formula $(Cp)_mMR_nR'_p$ wherein Cp is a substituted or unsubstituted cyclopentadienyl ring; M is a Group IV, V or VI transition metal; R and R' are independently selected halogen, hydrocarbyl group, or hydrocarboxyl groups having 1–20 carbon atoms; m=1–3, n=0–3, p=0–3, and the sum of m+n+p equals the oxidation state of M. In another embodiment the metallocene catalyst is represented by the formulas:

$(C_5R'_m)_pR''_s(C_5R'_m)MeQ_{3-p-x}$ $R''_s(C_5R'_m)_2MeQ'$ wherein Me is a Group IV, V, or VI transition metal, $C_5R'_m$ is a substituted cyclopentadienyl each R', which can be the same or different as hydrogen, alkenyl, aryl alkaryl or arylalkyl radical having from 1 to 20 carbon atoms or two carbon atoms joined together to form a part of a $C_4$ to $C_6$ ring. R" is one or more of or a combination of carbon, germanium, silicon, phosphorous or nitrogen atom containing radical substituting on and bridging two $C_5R'_m$ rings or bridging one $C_5R'_m$ ring back to Me, when p=0 and x=1 otherwise x is always equal to 0, each Q which can be the same or different as an aryl alkyl, alkenyl, alkaryl, or arylalkyl radical having from 1 to 20 carbon atoms or halogen. Q' is an alkylidene radical having from 1 to 20 carbon atoms, s is 0 or 1 and when s is 0, m is 5 and p is 0, 1 or 2 and when s is 1, m is 4 and p is 1.

Various forms of the catalyst system of the metallocene type may be used in the polymerization process of this invention. Exemplary of the development of metallocene catalysts in the art for polymerization of ethylene is the disclosure of U.S. Pat. No. 4,871,705 (Hoel), U.S. Pat. No. 4,937,299 (Ewen et al.), EP-A 0129368, published on Jul. 26, 1989, and U.S. Pat. No. 5,017,714 and U.S. Pat. No. 5,120,867 to Welborn, Jr. These publications teach the structure of the metallocene catalysts and include alumoxane as the co-catalyst. There are a variety of methods for preparing alumoxane, one of which is described in U.S. Pat. No. 4,665,208.

For purposes of this patent specification, the terms "co-catalysts" or "activators" are used interchangeably and are defined to be any compound or component which can activate a bulky ligand transition metal compound. In one embodiment the activators generally contain a metal of Group II and III of the Periodic Table of Elements. In the preferred embodiment, the bulky transition metal compounds are metallocenes, which are activated by trialkylaluminum compounds, alumoxanes both linear and cyclic, or ionizing ionic activators or compounds such as tri(n-butyl) ammonium tetra(pentafluorophenyl)boron, which ionize the neutral metallocene compound. Such ionizing compounds may contain an active proton, or some other cation associated with but not coordinated, or only loosely coordinated to the remaining ion of the ionizing ionic compound. Such compounds are described in EP-A 0520732, EP-A 0277003 and EP-A 0277004, published on Aug. 3, 1988, and U.S. Pat. No. 5,153,157, U.S. Pat. No. 5,198,401 and U.S. Pat. No. 5,241,025. Further, the metallocene catalyst component can be a monocyclopentadienyl heteroatom containing compound. This heteroatom is activated by either an alumoxane or an ionic activator to form an active polymerization catalyst system to produce polymers useful in this invention. These types of catalyst systems are described in, for example, WO-A 92/00333 published Jan. 9, 1992, U.S. Pat. No. 5,057,475, U.S. Pat. No. 5,096,867, U.S. Pat. No. 5,055,438 and U.S. Pat. No. 5,227,440, and EP-A 91/04257. In addition, the metallocene catalyst useful in this invention can include non-cyclopentadienyl catalyst components, or ancillary ligands such as boroles or carbollides in combination with a transition metal. Additionally, it is not beyond the scope of this invention that the catalysts and catalyst systems may be those described in U.S. Pat. No. 5,064,802 and WO-A 93/08221 and WO-A 93/08199 published Apr. 29, 1993. All the catalyst systems of the invention may be, optionally, prepolymerized or used in conjunction with an additive or scavenging component to enhance catalytic productivity.

Preferred metallocene catalysts according to the present invention include: racemic |1,1'-dimethylsilanylene-bis(3-methylcyclopentadienyl)| zirconium dichloride; |1,1'-dimethylsilanylene-bis(indenyl)| zirconiumdichloride; |1,1'-dimethylsilanylene-bis(4,5,6,7-tetrahydroindenyl)| zirconium dichloride; |1,1'-(1,1,2,2-tetramethyldisilanylene)-bis(3-methylcyclopentadienyl)| zirconium dichloride; |1,1'-(1,1,2,2-tetramethyldisilanylene)-bis(4,5,6,7-tetrahydroindenyl)| zirconium dichloride; |1,1'-dimethylsilanylene-bis(3-trimethylsilanylcyclopentadien)| zirconium dichloride; |1,1'-(1,1,2,2-tetramethyldisilanylene)-bis(3-trimethylsilanylcyclopentadienyl)| zirconium dichloride; |1,1'-(1,1,3,3-tetramethyldisiloxanylene)-bis(4,5,6,7-tetrahydroindenyl)| zirconium dichloride; |1,1'-(1,1,4,4-tetramethyl-1,4-disilanylbutylene)-bis(4,5,6,7-tetrahydroindenyl)| zirconium dichloride; |1,1'-(2,2-dimethyl-2-silapropylene)-bis(3-methylcyclopentadienyl)| zirconium dichloride.

POLYMERS

The polymers can be prepared by polymerizing monomer mixtures comprising ethylene and α-olefins, preferably from 3 to 4 carbon atoms, but up to 16 carbon atoms, in the presence of a metallocene catalyst system comprising at least one metallocene (e.g., a cyclopentadienyl-transition metal compound) and an activator, e.g., alumoxane compound. The comonomer content can be controlled through selection of the metallocene catalyst component and by controlling partial pressure or concentration of the monomers.

As such, the polymers which are useful in the present invention are polymers containing at least one carbon-carbon double bond (olefinic or ethylenic) unsaturation. Thus, the maximum number of functional groups per polymer chain is limited by the number of double bonds per chain.

Useful polymers in the present invention include polyalkenes including homopolymers, copolymers (used interchangably with interpolymer) and mixtures. Homopolymers and interpolymers include those derived from polymerizable olefin monomers of 2 to about 16 carbon atoms; usually 2 to about 6 carbon atoms.

Particular reference is made to the α-olefin polymers made using organometallic coordination compounds. A particularly preferred class of polymers are ethylene-α-olefin copolymers such as those disclosed in U.S. Pat. No. 5,017,299. The polymer unsaturation can be terminal, internal or both. Preferred polymers have terminal unsaturation, preferably a high degree of terminal unsaturation. Terminal unsaturation is the unsaturation provided by the last monomer unit located in the polymer. The unsaturation can be located anywhere in this terminal monomer unit. Terminal olefinic groups include vinylidene (i.e., ethenylidene) unsaturation, $R^aR^bC=CH_2$; trisubstituted olefin unsaturation, $R^aR^bC=CR^cH$; vinyl unsaturation, $R^aHC=CH_2$; 1,2-disubstituted terminal unsaturation, $R^aHC=CHR^b$; and tetra-substituted terminal unsaturation, $R^aR^bC=CR^cR^d$. At least one of $R^a$ and $R^b$ is a polymeric group of the present invention, and the remaining $R^b$, $R^c$ and $R^d$ are hydrocarbon groups such as hydrogen, hydrocarbyl, aryl, substituted aryl or substituted hydrocarbyl.

The polymer employed in this invention comprises polymer chains, at least about 30 percent of which possess terminal vinylidene unsaturation. Preferably at least about 50 percent, more preferably at least about 60 percent, and most preferably at least about 75 percent (e.g., 75–98%), of such polymer chains exhibit terminal vinylidene unsaturation. The percentage of polymer chains exhibiting terminal vinylidene unsaturation may be determined by FTIR spectroscopic analysis, titration, or $C^{13}$NMR.

The olefin monomers are preferably polymerizable terminal olefins; that is, olefins characterized by the presence in their structure of the group —R—C=CH$_2$, where R is hydrogen or a hydrocarbon group. However, polymerizable internal olefin monomers (sometimes referred to in the literature as medial olefins) characterized by the presence within their structure of the group:

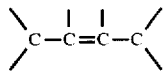

can also be used to form the polyalkenes. When internal olefin monomers are employed, they normally will be employed with terminal olefins to produce polyalkenes which are interpolymers. For this invention, a particular polymerized olefin, will be deemed a terminal olefin. Thus, pentadiene-1,3 (i.e., piperylene) is deemed to be a terminal olefin.

While the polyalkenes generally are hydrocarbon polyalkenes, they can contain substituted hydrocarbon groups such as lower alkoxy, lower alkyl mercapto, hydroxyl, mercapto, and carbonyl, provided the non-hydrocarbon moieties do not substantially interfere with the functionalization or derivatization reaction of this invention. When present, such substituted hydrocarbon groups normally will not contribute more than about 10% by weight of the total weight of the polyalkenes. Since the polyalkene can contain such non-hydrocarbon substituent, it is apparent that the olefin monomers from which the polyalkenes are made can also contain such substituents. As used herein, the term "lower" when used with a chemical group such as in "lower alkyl" or "lower alkoxy" is intended to describe groups having up to seven carbon atoms.

The polyalkenes may include aromatic groups and cycloaliphatic groups such as would be obtained from polymerizable cyclic olefins or cycloaliphatic substituted-polymerizable acrylic olefins. There is a general preference for polyalkenes derived from homopolymers and copolymers of terminal hydrocarbon olefins of 2 to 16 carbon atoms. This further preference is qualified by the proviso that, while interpolymers of terminal olefins are usually preferred, interpolymers optionally containing up to about 40% of polymer units derived from internal olefins of up to about 16 carbon atoms are also within a preferred group. A more preferred class of polyalkenes are those selected from the group consisting of homopolymers and interpolymers of terminal olefins of 2 to 6 carbon atoms, more preferably 2 to 4 carbon atoms. However, another preferred class of polyalkenes are the latter, more preferred polyalkenes optionally containing up to about 25% of polymer units derived from internal olefins of up to about 6 carbon atoms.

Specific examples of terminal monomers which can be used to prepare the polyalkenes include ethylene, propylene, butene-1, pentene-1, butadiene-1,3, and pentadiene-1,3.

Useful polymers include α-olefin homopolymers and interpolymers, and ethylene-α-olefin copolymers and terpolymers. Specific examples of polyalkenes include polypropylenes, poly-1-butenes, ethylene-propylene copolymers, ethylene-1-butene copolymers, and propylene-1-butene copolymers.

Preferred polymers are polymers of ethylene and at least one α-olefin having the formula H$_2$C=CHR$^4$ wherein R$^4$ is a straight chain or branched chain alkyl radical comprising 0 to 14 carbon atoms and wherein the polymer contains a high degree of terminal vinylidene unsaturation. Preferably, R$^4$ in the above formula is alkyl of from 1 to 8 carbon atoms and more preferably is alkyl of from 1 to 2 carbon atoms. Therefore, useful comonomers with ethylene in this invention include propylene, 1-butene, hexene-1, octene-1, etc., and mixtures thereof (e.g., mixtures of propylene and 1-butene, and the like). Preferred polymers are copolymers of ethylene and propylene and ethylene and butene-1.

The molar ethylene content of the polymers employed is preferably in the range of between about 20 to about 80%, and more preferably between about 30 to about 70%. When butene-1 is employed as a comonomer with ethylene, the ethylene content of such a copolymer is most preferably between about 20 to about 45 weight %, although higher or lower ethylene contents may be present. The most preferred ethylene-butene-1 copolymers are disclosed in copending U.S. patent application, Ser. No. 992,192, filed Dec. 17, 1992. The preferred method for making low molecular weight ethylene-α-olefin copolymers is described in U.S. patent application, Ser. No. 992,690, filed Dec. 17, 1992.

Preferred ranges of number average molecular weights of polymers for use as precursors for dispersants are from 300 to 10,000, preferably from 700 to 5,000, most preferably from 1,500 to 3,000. A convenient method for such determination is by size exclusive chromatography (also known as gel permeation chromatograph (GPC)) which additionally provides molecular weight distribution information. Such polymers generally possess an intrinsic viscosity (as measured in tetralin at 135° C.) of between 0.025 and 0.6 dl/g, preferably between 0.05 and 0.5 dl/g, most preferably between 0.075 and 0.4 dl/g. These polymers preferably exhibit a degree of crystallinity such that, when grafted, they are essentially amorphous.

The preferred ethylene-α-olefin polymers are further characterized in that up to about 95% and more of the polymer chains possess terminal vinylidene-type unsaturation. Thus, one end of such polymers will be of the formula POLY-C(R$^{11}$)=CH$_2$ wherein R$^{11}$ is C$_1$ to C$_{18}$ alkyl, preferably C$_1$ to C$_8$ alkyl, and more preferably methyl or ethyl and wherein POLY represents the polymer chain. A minor amount of the polymer chain can contain terminal ethenyl unsaturation, i.e., POLY—CH=CH$_2$, and a portion of the polymers can contain internal mono-unsaturation, e.g., POLY—CH=CH(R$^{11}$), wherein R$^{11}$ is as defined above.

AMINES

Suitable amines for use in forming fuel additives or detergents are disclosed in U.S. Pat. No. 3,438,757 (Honnen et al.), which issued on Apr. 15, 1969, and include N-substituted amines and alkylene polyamines.

Illustrative compositions of desired N-substituted amines include, but are not limited to, polypropenyl amine, polyisobutenyl amine, N-polyisobutenyl dimethylamine, N-polyisobutenyl methylethylamine, N-polypropenyl diethylamine, N-polypropenyl di(2-hydroxyethyl) amine, N-polyisobutenyl N-methyl aniline, N-polyisobutenyl morpholine, N-polyisobutenyl piperidiene, N-poly(1-butene) propylamine, N-polypropenyl N-(2-hydroxyethyl) amine, etc.

Preferred alkylene polyamines which are substituted with the hydrocarbon radical may be derived from such alkylene amines as ethylene diamine, diethylene triamine, tetraethylene pentamine, nonaethylene decamine, 1,2-propylene diamine, tetramethylene diamine, etc.

In many instances a single compound will not be used as a reactant in the preparation of the dispersants of the present invention. That is. mixtures will be used in which one or two compounds will predominate and the average composition or molecular weight is indicated. Illustrative compounds within the above formula are as follows: N-polyisobutenyl ethylene diamine. N-polypropenyl ethylene diamine. N-poly (1-butenyl)ethylene diamine. N-(alternating copolymers of ethylene and isobutylene may be achieved by the cationic polymerization of 4-methylpentene-1). N-poly(1-pentenyl) diethylene triamine. N-polypropenyl trimethylene diamine. N-polyisobutenyl trimethylene diamine. N-polypropenyl di- (trimethylene) triamine. N-polyisobutenyl di(trimethylene) triamine. N-polyisobutenyl 1,2-propylene diamine. N-polyisobutenyl di(1,2-propylene) triamine. N-polypropenyl triethylene tetramine. N-polyisobutenyl triethylene tetramine. N-(alternating copolymer of ethylene and isobutylene) triethylene tetramine. N-polypropenyl tetraethylene pentamine. N-polyisobutenyl tetraethylene pentamine. N-polyisobutenyl pentaethylene hexamine, etc.

The following polyhydrocarbon radical substituted alkylene polyamine compositions are also desirable: N,N'di (polypropenyl)diethylene triamine. N,N'-di(polyisobutenyl) diethylene triamine. N,N'-di(polyisobutenyl) triethylene tetramine. N,N'-di(polypropenyl) tetraethylene pentamine. N'N'-di(polyisobutenyl) tetraethylene pentamine. N,N',N'-tri (polyisobutenyl) tetraethylene pentamine. N,N'-di (polyisobutenyl) 2-aminoethylpiperazine. N,N'-di(poly-1-butenyl)triethylene tetramine. N,N'-di(polyisobutenyl) di(trimethylene) triamine. etc.

The preferred compositions for use in making fuel detergents are those having the straight chain alkylene polyamines, particularly ethylene diamine and polyethylene polyamines.

Amines which are useful in forming dispersants for use in lubricating applications are set forth in U.S. Pat. No. 4,234,435 (Meinhardt), which issued on Nov. 18, 1980. The amine for use in forming lubricating dispersants, characterized by the presence within its structure of at least one H—N< group, can be a monoamine or polyamine compound. Preferably, the amine contains at least one primary amino groups (i.e., —NH$_2$) and more preferably the amine is a polyamine, especially a polyamine containing at least two H—N<groups, either or both of which are primary or secondary amines.

The amines can be aliphatic, cycloaliphatic, aromatic, or heterocyclic, including aliphatic-substituted cycloaliphatic, aliphatic-substituted aromatic, aliphatic-substituted heterocyclic, cycloaliphatic-substituted aliphatic, cycloaliphatic-substituted aromatic, cycloaliphatic-substituted heterocyclic, aromatic-substituted aliphatic, aromatic-substituted cycloaliphatic, aromatic-substituted heterocyclic, heterocyclic-substituted aliphatic, heterocyclic-substituted alicyclic, and heterocyclic-substituted aromatic amines and may be saturated or unsaturated. If unsaturated, the amine will be free from acetylenic unsaturation (i.e., —C≡C—). The amines may also contain non-hydrocarbon substituents or groups.

With the exception of the branched polyalkylene polyamine, the polyoxyalkylene polyamines, and the high molecular weight hydrocarbyl-substituted amines, the amines ordinarily contain less than about 40 carbon atoms in total and usually not more than about 20 carbon atoms in total.

The additives, particularly those adapted for use as dispersants or viscosity modifiers, can be incorporated into a lubricating oil in any convenient way. Thus, they can be added directly to the oil by dispersing or dissolving the same in the oil. Such blending into the additional lube oil can occur at room temperature or elevated temperatures. Alternatively the additives may be first formed into concentrates, which are in turn blended into the oil. Such dispersant concentrates will typically contain as active ingredients from 10 to 80 wt. %, typically 20 to 60 wt. %, and preferably from 40 to 50 wt. %, additive, (based on the concentrate weight) in base oil.

The additives may be mixed with other additives selected to perform at least one desired function. Typical of such additional additives are detergents, viscosity modifiers, wear inhibitors, oxidation inhibitors, corrosion inhibitors, friction modifiers, foam inhibitors, rust inhibitors, demulsifiers, antioxidants, lube oil flow improvers, and seal swell control agents.

When other additives are employed, it may be desirable, although not necessary, to prepare additive concentrates or packages comprising concentrated solutions or dispersions of the subject additives of this invention together with one or more of the other additives. Dissolution of the additive concentrate into lubricating oil may be facilitated by solvents and by mixing accompanied with mild heating, but this in not essential. The final formulations may employ typically 2 to 20 wt. %, e.g., about 10 wt. %, of the additive package with the remainder being base oil.

EXAMPLE 1

(Comparative)

This example compares the conversion of various polymeric olefins to polymeric aldehydes under hydroformylating conditions. The polymers were (1) a boron-fluoride catalyzed cationic polyisobutylene, (2) an ethylene-propylene copolymer according to the present invention, (3) a poly-N-butylene, and (4) an aluminum chloride catalyzed polyisobutylene. Each polymer was separately charged, at room temperature, into a rocking, two liter volume, stainless steel autoclave fitted with internal cooling coils, together with a dicobalt octacarbonyl catalyst. The autoclave was then sealed and pressurized with 1,000 psig (6.996×10$^6$ N/m$^2$) of carbon monoxide and hydrogen (volume ratio of 1/1). The autoclave was then heated to 120° C. for 5 hours with rocking to the indicated reaction time, cooled to room temperature and then the contents were removed. The product was demetaled of cobalt by shaking over a 30 minute period with 300 ml of 10 wt. % aqueous acetic acid at 30° to 45° C. in an atmosphere of air at one atmosphere pressure. The demetaling procedure was repeated twice with fresh aqueous acetic acid. The product was then washed three times with water and the solvent removed under vacuum by heating at 40° to 70° C. Conversion was determined by the standard AI test. The results are set forth below in Table 1.

TABLE 1

| Sample | Mn | Polymer (grams) | Heptane (grams) | Catalyst* (grams) | Percent of Conversion to Polymeric Aldehyde |
|---|---|---|---|---|---|
| 1 | 1000 | 284.7 | 751.7 | 4.5 | 30.9 |
| 2 | 1000 | 307.3 | 665.5 | 5.5 | 70.8 |
| 3 | 500 | 388.3 | 657.6 | 5.6 | 18.4 |
| 4 | 1000 | 380.0 | 688.9 | 6.0 | 37.6 |

*Denotes a dicobalt octacarbonyl catalyst.

Table 1 compares the conversion to hydroformylated products of three types of polybutenes to that of the metallocene catalyzed ethylene-propylene copolymer of the present invention. The lower heating temperature of 120° C.

tends to favor aldehyde rather than alcohol formation. The yield of functionalized ethylene-propylene copolymer was almost twice that observed with any of the functionalized polybutene polymers.

EXAMPLE 2

(Comparative)

This example compares the conversion of various polymeric olefins to polymeric alcohols under hydroformylating conditions. The polymers were (1) a boron-fluoride catalyzed cationic polyisobutylene, (2) a ethylene-propylene copolymer according to the present invention, (3) a poly-N-butylene, and (4) an aluminum chloride catalyzed polyisobutylene. Each polymer was separately charged, at room temperature, into a rocking, two liter volume, stainless steel autoclave fitted with internal cooling coils, together with a dicobalt octacarbonyl catalyst. The autoclave was then sealed and pressurized with 1,000 psig ($6.996 \times 10^6$ N/m$^2$) of carbon monoxide and hydrogen (volume ratio of 1/1). The autoclave was then heated to 170° C. for 5 hours with rocking to the indicated reaction time, cooled to room temperature and then the contents were removed. The product was demetaled of cobalt by shaking over a 30 minute period with 300 ml of 10 wt. % aqueous acetic acid at 30° to 45° C. in an atmosphere of air at one atmosphere pressure. The demetaling procedure was repeated twice with fresh aqueous acetic acid. The product was then washed three times with water and the solvent removed under vacuum by heating at 40° to 70° C.

Next, the polymeric aldehydes in the demetaled, reaction product were reduced to alcohols by treatment with sodium borohydride. This was by addition of 10 to 15 grams of sodium borohydride powder and 50 to 100 ml of isopropanol, with stirring, for two to three hours (with cooling from an ice bath to maintain the exothermic reaction at 45° to 50° C.). The product was then filtered, using filter aid on paper, washed with water, 5% aqueous hydrochloric acid, and then twice more with water. Next, the solvent and isopropanol residue were removed under vacuum by heating at 40° to 70° C. Conversion was determined by the standard AI test. The results are set forth below in Table 2.

TABLE 2

| Sample | Mn | Polymer (grams) | Heptane 0 | Catalyst* (grams) | Percent of Conversion to Polymeric Aldehyde |
|---|---|---|---|---|---|
| 1 | 1000 | 383.9 | 725.8 | 6.2 | 68.4 |
| 2 | 1100 | 391.4 | 703.6 | 6.5 | 82.9 |
| 3 | 500 | 389.7 | 664.7 | 6.1 | 47.7 |
| 4 | 1000 | 495.0 | 525.0 | 7.0 | 71.9 |

*Denotes a dicobalt octacarbonyl catalyst.

Table 2 compares the conversion to hydroformylated products of three types of polybutenes to that of the metallocene catalyzed ethylene-propylene copolymer of the present invention. The higher heating temperature of 170° C. tends to favor alcohol rather than aldehyde formation. The reaction products were further reduced with sodium borohydride to convert any remaining aldehyde to alcohol. The yield of functionalized ethylene-propylene copolymer was substantially higher than that observed with any of the functionalized polybutene polymers.

EXAMPLE 3

30 grams of an ethylene-propylene copolymer formed in accordance with the present invention containing about 85% vinylidene olefin structure and having a number average molecular weight (Mn) of 1600 was combined with 30 grams of hexane, 3.8 grams of 3-dimethylamino propylamine and 26 mg of rhodium dicarbonyl acetylacetonate (Rh(CO)$_2$AcAc). The reaction mixture was pressured to 1,000 psi ($6.895 \times 10^6$ N/m$^2$) with carbon monoxide and hydrogen in a 1/1 ratio and heated at 150° C. for 28 hours.

Solvent and excess amine were removed by heating and vacuum. The polymer product contained 86% aminated polymer (active ingredient) determined by column chromatography. Elemental nitrogen by duplicate analysis was 1.37% (1.63% theory for 100% conversion).

EXAMPLE 4

Example 3 was repeated using a cationic polymer of poly-n-butene (PNB). This polymer has a high trisubstituted olefin content and a number average molecular weight (Mn) of 559. After 28 hours reaction time, the product contained only 39% aminated polymer.

EXAMPLE 5

Example 3 above was repeated using a 42 hour reaction time. The conversion (AI) was 90.0% and elemental nitrogen was 1.36%.

EXAMPLE 6

The method of Example 3 above was repeated using an ethylene-butene polymer with a number average weight of 2,000. The product had an aminated polymer content of 83.2% and an elemental nitrogen content of 1.03%.

EXAMPLE 7

The method of Example 3 above was repeated using 6.5 mg of catalyst and a 120° C. reaction temperature. The product had an aminated polymer content of 88.1% and an elemental nitrogen content of 1.41%.

EXAMPLE 8

The method of Example 3 above was repeated using a butylene-propylene polymer with a number average weight of 2,140. The product had an aminated polymer content of 69.3% and an elemental nitrogen content of 0.64%.

EXAMPLE 9

The method of Example 3 above was repeated using aminoethylpiperazine as the amine (2 mole of amine per mole of ethylene-butene polymer) and 52 mg of catalyst. The product had an aminated polymer content of 88.8% and an elemental nitrogen content of 2.07% (theory 2.43%).

EXAMPLE 10

The method of Example 3 above was repeated using 105 mg of triphenylphosphine ligand and 52 mg of catalyst. The product had an aminated polymer content of 77.9% and an elemental nitrogen content of 1.18%.

EXAMPLE 11

The method of Example 3 above was repeated using a 1-butene polymer prepared via a metallocene catalyst with a number average weight of 978. The product had an aminated polymer content of 66.5% and an elemental nitrogen content of 1.60%.

While we have shown and described several embodiments in accordance with our invention, it is to be clearly understood that the same are susceptible to numerous changes apparent to one skilled in the art. Therefore, we do not wish to be limited to the details shown and described but intend to show all changes and modifications which come within the scope of the appended claims.

What is claimed is:

1. A method of producing a polymeric hydroformylation product comprising:

reacting a polyolefin having terminal unsaturation and an $\overline{M}_n$ of about 300 to 10,000, the polyolefin being derived from a monomer or mixture of monomers of the formula $H_2C=CHR^4$, wherein $R^4$ is hydrogen or a straight or branched chain alkyl radical;

hydrogen and carbon monoxide in the presence of a hydroformylation catalyst, under hydroformylation conditions.

2. The method of claim 1 wherein the terminal unsaturation of said polyolefin comprises at least 30% terminal vinylidene unsaturation.

3. A method of claim 2 wherein said polyolefin is polymerized from monomers with a metallocene catalyst.

4. The method of claim 1 further comprising reductively aminating the polymeric hydroformylation product to form a nitrogen-containing polymeric product having an alkylamino substituent.

5. A method of forming an aminomethylation reaction product comprising:

reacting a polyolefin having terminal unsaturation, wherein said terminal unsaturation comprises at least 30% vinylidene unsaturation, and an $\overline{M}_n$ of about 300 to 10,000, the polyolefin being derived from a monomer or mixture of monomers of the formula $H_2C=CHR^4$, wherein $R^4$ is hydrogen or a straight or branched chain alkyl radical;

hydrogen and carbon monoxide in the presence of an amine and a hydroformylation catalyst, under conditions to aminoalkylate the polyolefin.

6. The method of claim 5 wherein said hydroformylation catalyst is a rhodium, ruthenium, or cobalt containing catalyst.

7. The method of claim 1 further comprising cyanoalkylation and hydrogenation of a hydrogenated polymeric hydroformylation reaction product to produce an aminated polymer.

8. The method of claim 7 wherein said catalyst is a rhodium catalyst.

* * * * *

UNITED STATES PATENT AND TRADEMARK OFFICE
Certificate

Patent No. 5,780,554                      Patented: July 14, 1998

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Jacob I. Emert, Brooklyn, N.Y.; Richard H. Schlosberg, Bridgewater, N.J.; Warren A. Thaler, Flemington, N.J.; and David A. Young, Seattle, Wash.

Signed and Sealed this Seventeenth Day of November, 1998.

JEFFREY T. SMITH
*Supervisory Patent Examiner*
Art Unit 1713